J. S. BEALLE.
TRAP.
APPLICATION FILED JULY 18, 1918.
1,321,588.
Patented Nov. 11, 1919.
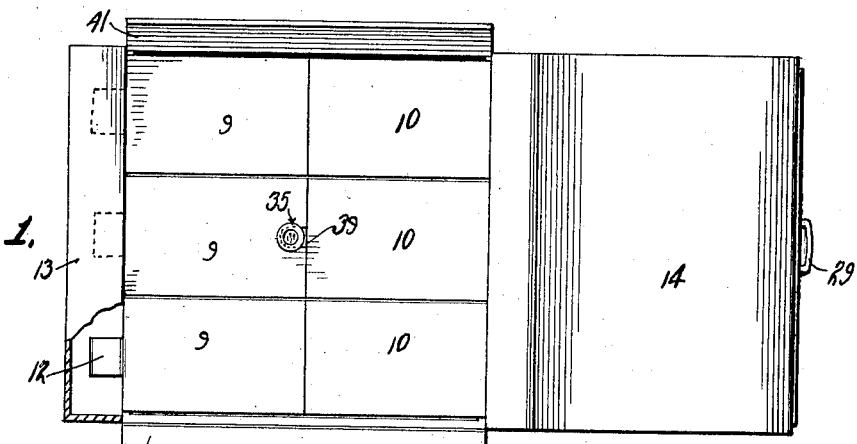
FIG. 1.
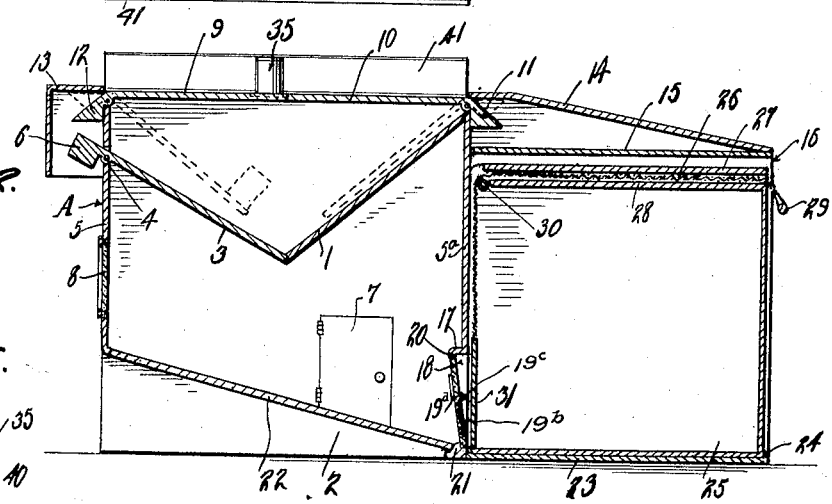
FIG. 2.
FIG. 6.
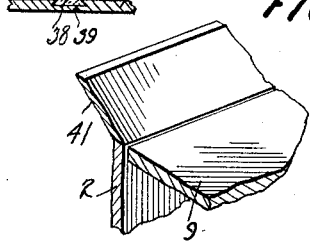
FIG. 3. FIG. 4.
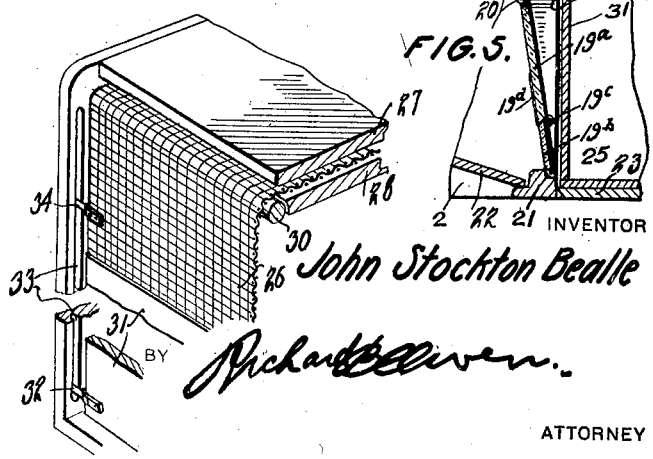
FIG. 5.
INVENTOR
John Stockton Bealle
WITNESSES
W. C. Fielding
W. H. Babcock
BY
ATTORNEY

UNITED STATES PATENT OFFICE.

JOHN STOCKTON BEALLE, OF WALDORF, MARYLAND.

TRAP.

1,321,588.  Specification of Letters Patent.  Patented Nov. 11, 1919.

Application filed July 18, 1918. Serial No. 245,531.

*To all whom it may concern:*

Be it known that I, JOHN STOCKTON BEALLE, a citizen of the United States, residing at Waldorf, in the county of Charles and State of Maryland, have invented certain new and useful Improvements in Traps, of which the following is a specification.

This invention relates to traps, and more particularly to traps of that type employing a casing and a tiltable closure member for the same so as to discharge animals which walk upon said member into the trap.

One of the main objects of the invention is to provide a trap of the type stated of simple construction and operation in which the animal, when once deposited in the main casing, will be effectually prevented from escaping therefrom. A further object is to provide a trap in which upward movement of the tiltable frame is positively limited so as to effectually prevent escape of the animal in the event that it is not deposited within the body portion of the main casing. Another object is to provide a trap having a supplemental casing and a cage mounted therein, means being provided for permitting animals which are deposited in the main casing to enter into the cage, this cage being provided with a closure member which is operative exteriorly of the main and supplemental casing, thus permitting animals which have entered the cage to be secured therein after which the cage may be removed and the animals drowned or killed in any other suitable manner. Further objects will appear from the detailed description.

In the drawings:—

Figure 1 is a top plan view of a trap constructed in accordance with my invention, partly broken away;

Fig. 2 is a central vertical section through the trap,

Fig. 3 is a fragmentary detail perspective of the upper portion of the trap,

Fig. 4 is a fragmentary detail front perspective of the cage,

Fig. 5 is a detail sectional view through a modified form of closure member for controlling communication between the main casing and the cage, Fig. 6 is a detail sectional view through the bait container.

The main casing designated generally by A, is of box like construction being of rectangular shape in cross section. A downwardly and inwardly inclined closure plate 1 is rigidly secured between the side walls 2 of the body and coöperates with an oppositely inclined closure plate 3 which is hingedly mounted adjacent its upper end on a rod or pintle carried by the front wall 5 of the casing, to form a receiving hopper for directing animals deposited thereon into the body portion of the casing. Closure plate 3 is normally held in raised position by a weight member 6 provided at the outer end thereof, this weight member being such as to normally hold plate 3 in raised or operative position, and permitting. this plate to be readily moved downwardly and inwardly so as to deposit an animal directed into the hopper in the casing, as stated. A door 7 is hingedly secured in the side wall of the casing and is normally secured in closed position frictionally, or any suitable means may be provided for securing this door closed. This door permits easy access to the interior of the casing, for cleaning, repairs, and other purposes. A window 8 of any suitable transparent material is also provided in the front wall 5 for observation purposes.

The top of the casing is normally closed by a plurality of oppositely directed tiltably mounted plates 9 and 10 which are hingedly secured at their outer ends to the upper edges of the front and back walls 5 and 5ª, respectively, of the main casing. These plates correspond in length to one half the width of the casing so that, when in raised position, the inner edges are in light contact, thus completely closing the upper end of the casing. Plates 10 are normally held in raised position by weight members 11 formed at the outer ends thereof, plates 9 being held in raised position by similar weight members 12 which are protected by a flat housing 13 secured to the front wall of the casing. Weight members 11 are protected by a housing and cover plate 14 which extends outwardly from the upper edge of the back wall 5ª of the casing, the outer edge of this cover plate being secured to the outer edge of the top wall 15 of a supplemental casing 16 projecting rearwardly from the main casing, and coöperating with the plate 14 to provide a housing for weights 11. As will be noticed more clearly from Fig. 2 of the drawings, weights 11 and 12 are of substantially triangular shape and when the plates 9 and 10 are depressed, the oblique sides of these weights come up against the flat portions of the housing. On the other hand, when the plates 9 and 10 are in raised position, these weights have one face disposed vertically and in contact with the outer faces of the walls 5 and 5ᵃ of the casing, the weights 11 and 12 thus acting to positively limit upward movement of the plates 10 and 9, respectively. In this manner, the weights in addition to returning the closure plates to normal or closed position also act as stop members to positively prevent upward movement of these plates beyond the horizontal so that, in the event that an animal deposited into the receiving hopper or chute formed by plates 1 and 3 does not immediately fall into the interior of the casing A, escape of this animal by raising plates 9 and 10 will be effectually prevented.

The back wall 5ᵃ of the main casing is provided, adjacent its lower edge, with an inwardly directed flange 17 which defines an escape opening 18 for animals which are deposited within the casing. This opening is normally closed by a downwardly and outwardly inclined closure member or door 19 which is hingedly secured at its top, as at 20, to the flange 17. Inward movement of this door is positively limited by a stop member or shoulder 21 which projects from the bottom 22 of the main casing. The closure member 19 is made of glass or other suitable transparent material so that when an animal deposited in the casing will attempt to escape therefrom by lifting the closure member.

As will be noted more particularly from Fig. 2 of the drawings, the bottom 22 is formed as a continuation of the front wall 5 and has a decided downward and rearward inclination. In practice, the upper surface of this bottom is smooth and free of all roughnesses or obstructions. The bottom acts to direct animals which fall into the casing downwardly toward the door 19.

The supplemental casing 16 is provided, at the back edge of bottom 23 thereof, with a vertical flange 24. This supplemental casing is adapted to receive a removable cage 25 of such size as to fit snugly between the flange 24 and back wall 5ᵃ of main casing A. This cage is provided with a top 28 which is spaced from a top plate 27. A fabric strip 26 is operative between the members 28 and 27, this strip being preferably formed of screen wire of proper strength and corresponding in width to the width of the cage 25. An operating handle 29 is secured to the strip of fabric at the outer end thereof, and this strip is passed inwardly and downwardly about a roller 30 which is rotatably mounted in the side walls of the cage adjacent the inner upper corner thereof. This strip 28 extends downwardly substantially two-thirds of the height of cage 25 and carries at its inner end a closure plate 31 secured thereto, this plate extending the full width of the cage and being provided at each end with a guide finger 32 which is operative in a guide slot 33 formed in the side wall of the cage. The fabric strip 28 is also provided with a similar guide finger 34 operative in the slot, these fingers acting to insure accurate operation of the fabric strip and closure plate 31. Normally, plate 31 is held in raised position so as to permit ready entry into the cage of an animal from the main casing by means of the escape opening 18. The fabric strip 28 and plate 31 are so related that when the plate is raised to its highest position, the weight of strip 28 combined with the frictional grip thereof on the upper outer corner of the cage end on the guide roller 30 will serve to maintain this plate raised. When it is desired to lower the plate, strip 26 is raised and pushed inwardly between the top 27 and top plate 28, plate 31 being thus moved into lowered position as illustrated in Fig. 2 and serving to close the cage, movement of plate 31 either inwardly or outwardly being positively prevented by the guide fingers 32 engaging into the slots 33. In this manner, animals which have been deposited in the casing A can escape into the cage 25, their return into casing A being positively prevented by the closure member 19. By lowering the plate 31 these animals are prevented from escaping from the cage 25 which may then be removed from the supplemental casing 16, the cage being then placed in a bucket or other suitable receptacle containing water and the animals drowned. As will be appreciated, the fabric strip 28 permits the water to readily enter into the cage 25 for the purpose specified.

The central one of plates 9 is provided with a suitable bait receptacle designated generally by 35. This receptacle is formed from an inner cylindrical container 36 of glass or other suitable transparent material provided at its upper end with an outer annular flange 37. Said container is also provided, at its lower end, with an integral depending downwardly flaring head 38 which fits into a substantially dovetail slot 39 extending inwardly from the inner end of member 9, the securing head 38 fitting tightly into the slot so as to frictionally secure the bait receptacle in position. An outer transparent cylinder 40 is mounted loosely about the inner cylinder 36 concentric therewith and is confined between the flange 37 and plate 9. This outer cylinder is freely rotatable so that when grasped by an animal when one of the tiltable plates is tilted, it will turn easily effectually preventing the animal from obtaining a sufficient grip upon the bait receptacle to permit its escape from the trap. Each side wall of the main casing is provided with an upwardly and outwardly directed flange 41 which serves to direct the animals upon the tiltable plates 9 and 10. Also, as will be noted more clearly from Fig. 2, the cover plate 14 is inclined downwardly and outwardly from the main casing A thus providing in effect, an incline or a chute by means of which the animals to be trapped may readily walk upwardly onto the tiltable closure plates.

When it is desired to use the trap for catching animals of different sizes, such as rats and mice, I provide a modified form of closure member or door for closing the escape opening, such as illustrated in Fig. 5. In this form, the door is provided with an upper main section 19$^a$ and a lower section 19$^b$ hingedly secured thereto as at 19$^c$. The lower member 19$^b$ is transparent, and the lower portion of the upper member 19$^a$ is covered with any suitable opaque material, as at 19$^d$ to such a height as to prevent the mice from seeing through the upper section. This produces a lower transparent closure member through which the smaller animals, such as mice may readily enter the cage 25, the larger and stronger animals also being able to enter the cage in the manner previously described.

With this construction, the removable cage 25 is inserted into the supplemental casing as shown in Fig. 3 and its plate 31 raised. Lured by the bait, animals now pass over the flat top of the housing onto the plates 9 or 10 which descend as seen in dotted lines and drop them onto the plate 3, this descends and drops them onto the bottom 22, and the inclination of the latter causes them to move downward or slide downward to the door 19. Through this larger animals may see, even if the opaque portion 19$^d$ is employed, and smaller animals will see through the transparent portion 19$^b$. The result is that the animals are induced to pass into the cage by passing through this door, and the latter swings closed against the shoulder 21. Meanwhile the plates rise under the influence of their weights, and animals within the casing can not escape otherwise than through the door 19. From time to time the plate 31 is permitted to descend, and the cage is removed and the animals are drowned; after which the cage is restored to position and the trap operates as described.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a trap, the combination with a main casing open at its top and having flat housings extending from its upper edges laterally, an exit door from said casing, and a receiving cage opposite said door; of plates hinged on the side walls of the casing and adapted to meet end to end when they stand horizontally, and a triangular weight carried by the outer end of each plate with its oblique side adapted to rise into contact with said housing when the plate descends and its upright side adapted to contact with the wall of the housing when the plate rises.

2. In a trap, the combination with a casing having an outlet door in the lower portion of one side wall, a supplemental housing projecting from said wall and inclosing said door, and hinged plates at the top of the main casing; of a cage removably insertible into the supplemental casing, and a movable plate in the inner side of said cage adapted to be set opposite said outlet door when the cage is removed from the supplemental casing.

3. In a trap, the combination with a casing having an outlet door in the lower portion of one side wall, a supplemental housing projecting from said wall and inclosing said door, and hinged plates at the top of the main casing; of a cage removably insertible into the supplemental housing, and having its inner side open and provided with upright guides, a plate adapted to stand opposite said outlet door and having fingers moving in said guides, a wire screen rising from said plate and also having fingers moving in the guides, a roller over which the screen passes along the top of the cage, and a handle at the outer end of the screen.

4. In a trap, the combination with a main casing having an outlet opening in one wall, means for trapping an animal within said casing, and a cage outside said wall for receiving trapped animals; of an outlet door hinged at its top at the top of said opening, and a supplemental door hinged to the main door, the supplemental door being transparent and the main portion of the door above the hinge of the supplemental door being opaque.

In testimony whereof I affix my signature in presence of a witness.

JOHN STOCKTON BEALLE.

Witness:
M. E. JONES.